(No Model.)  2 Sheets—Sheet 1.

S. P. HARBAUGH.
BALING PRESS.

No. 300,866. Patented June 24, 1884.

WITNESSES:

INVENTOR:
S. P. Harbaugh
BY
ATTORNEYS.

(No Model.) 2 Sheets—Sheet 2.

S. P. HARBAUGH.
BALING PRESS.

No. 300,866. Patented June 24, 1884.

WITNESSES:
Chas. Nida.
C. Sedgwick

INVENTOR:
S. P. Harbaugh
BY Munn & Co.
ATTORNEYS.

UNITED STATES PATENT OFFICE.

SIMON P. HARBAUGH, OF CUMBERLAND, MARYLAND.

BALING-PRESS.

SPECIFICATION forming part of Letters Patent No. 300,866, dated June 24, 1884.

Application filed December 21, 1883. (No model.)

*To all whom it may concern:*

Be it known that I, SIMON P. HARBAUGH, of Cumberland, in the county of Alleghany and State of Maryland, have invented certain new and useful Improvements in Baling-Presses, of which the following is a full, clear, and exact description.

Reference is to be had to the accompanying drawings, forming part of this specification, in which similar letters of reference indicate corresponding parts in all the figures.

Figure 2:
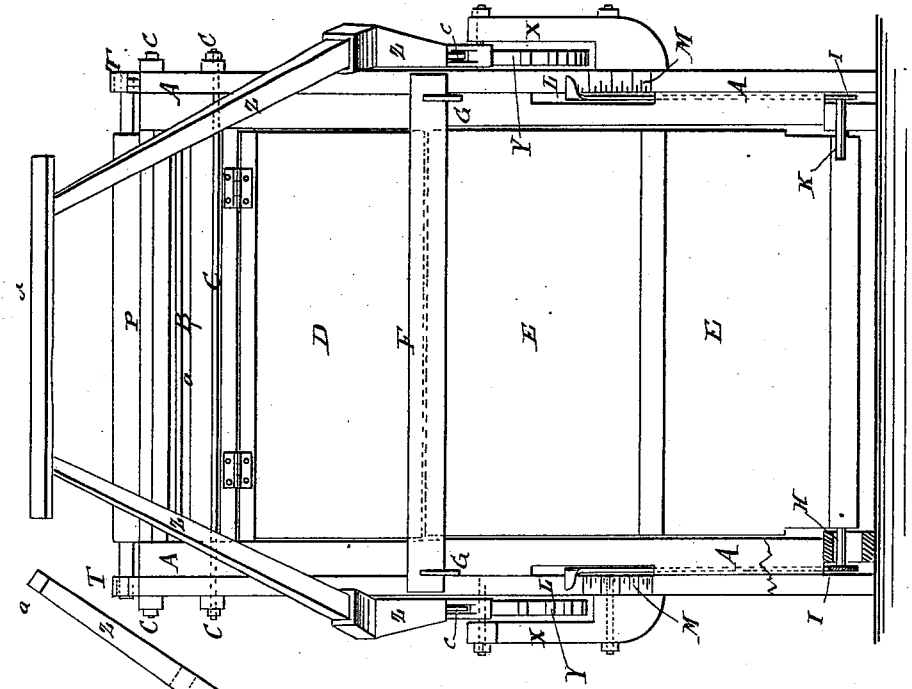
Figure 1:
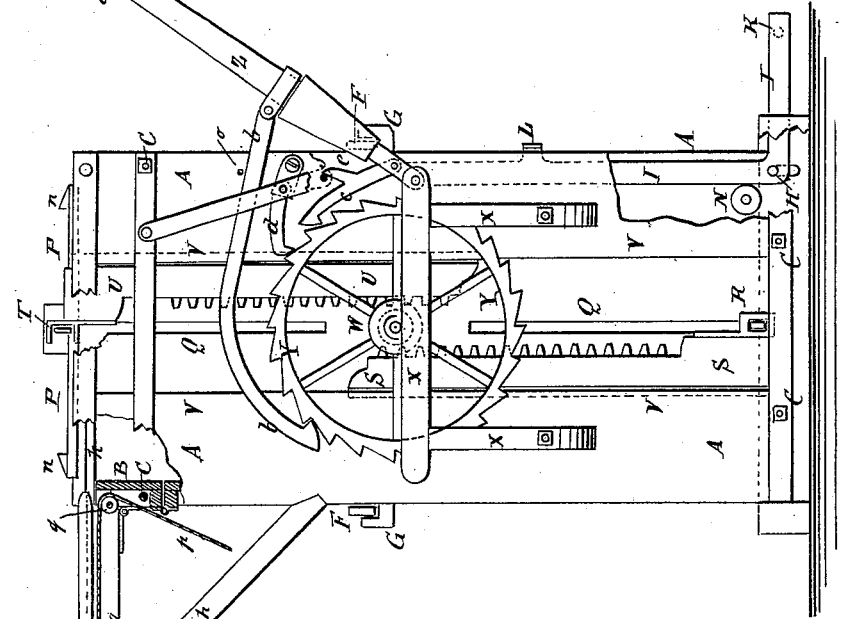
Figure 4:
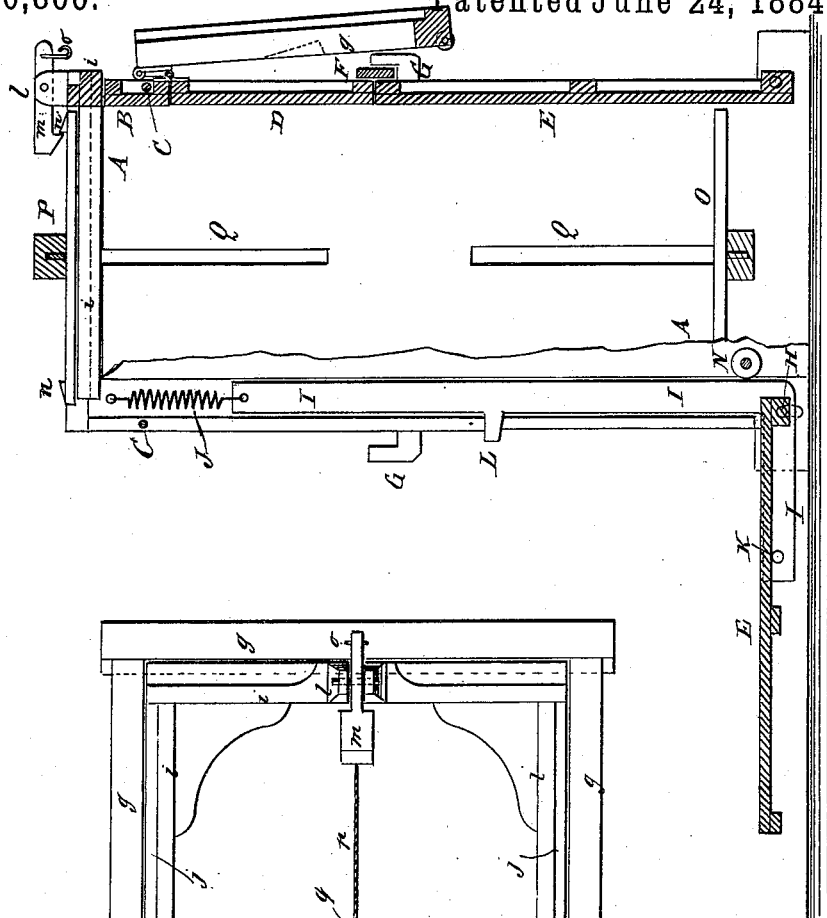
Figure 3:
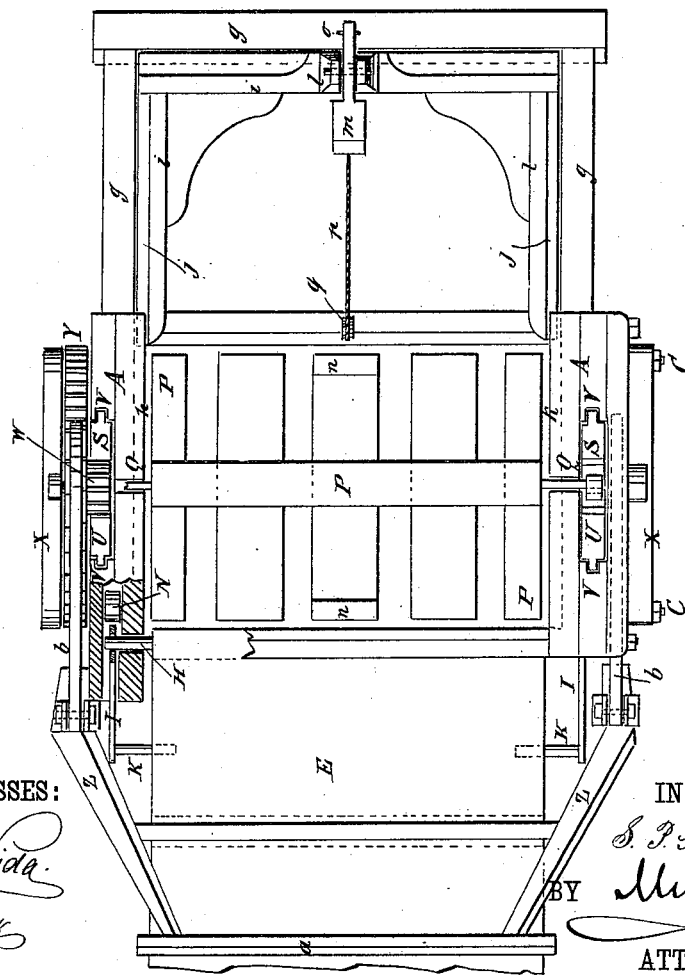

Figure 1, Sheet 1, is an end elevation of my improvement, partly in section and parts being broken away. Fig. 2, Sheet 1, is a front elevation of the same, part being broken away. Fig. 3, Sheet 2, is a plan view of the same, part being broken away. Fig. 4, Sheet 2, is a sectional end elevation of the same, part being broken away.

The object of this invention is to facilitate the baling of cotton, hay, and other substances.

A further object of the invention is to adapt the press to serve as a platform-scale for weighing the bales as they are discharged from the said press.

The invention consists in a baling-press constructed with the operating-levers connected with the ratchet-wheels that operate the gear-wheels, rack-bars, and followers by long pawls, short pawls, and holding-pawls, so that the followers can be moved with greater speed and less power when the material is loose, and with less speed and greater power when the material becomes more compact. The short pawls are provided with projecting arms, which engage with pins attached to the press ends, so that the said short pawls will be raised from the ratchet-wheels by their own forward movement, and will also raise the holding-pawls, releasing the ratchet-wheels. The lower corners of the press-doors are connected by pins with right-angle bars placed within the double-walled ends of the press, with their short arms projecting, and provided with pins, the said bars being supported by graduated springs and provided with indexes, so that the bale can be weighed as it comes from the press. The upper follower is provided with a catch, and to the upper part of the rear side of the press is hinged a frame supported in a horizontal position by detachable braces, and provided with a sliding frame provided with a lever-hook carrying a trip-hook, and with two cords, whereby the said follower can be readily withdrawn and replaced. The upper follower is connected with its rack-bars by keepers open upon one side, whereby the said bars and follower can be disconnected and connected automatically, as will be hereinafter fully described.

A are the ends of the press, which are connected by the base, the narrow stationary upper parts, B, of the sides, and by the tie-rods C.

To the lower edges of the narrow stationary sides B are hinged the upper edges of the upper doors, D, the free lower edges of which and the free upper edges of the lower doors, E, are secured in place when closed by bars F. The ends of the locking-bars F are inserted in keepers G, attached to the edges of the ends A of the press.

To the lower corners of the lower doors, E, are attached pins H, which pass through short slots in the inner parts of the ends A of the press, and enter holes in angular parts of the right-angled bars I. The upright longer arms of the bars I are placed in recesses between the parts of the double walls of the ends A, as shown in Figs. 1, 3, and 4, and in dotted lines in Fig. 2, and to their upper ends are attached the lower ends of the graduated springs J, the upper ends of which are attached to the said ends of the press. The shorter lower arms of the bars I project horizontally, and to their outer ends are attached inwardly-projecting pins K, for the doors E to rest upon when turned down into a horizontal position, so that the said doors will be suspended by the springs J. By this construction, when a completed bale is rolled from the baling-box upon the turned-down door E, the springs J will be put under more or less tension, and the bars I will descend more or less according to the gravity of the bale lying upon the door E. The weight of the bale is shown by indexes L, formed upon or attached to the upright arms of the bars I, and which project through slots in the forward edges of the ends A, and move along scales M of division-marks formed upon or attached to the said edges.

Within the recesses in the ends A of the press are pivoted small rollers N, for the lower parts of the rear edges of the upright arms of the bars I to rest against, to hold the said bars against inward pressure, relieve the pins H from strain, and lessen the friction as the said bars move up and down.

O is the lower follower, and P is the upper follower, the ends of the center bars of which, or tenons formed upon the said ends, pass through vertical slots Q, formed in the lower and upper parts of the ends A. The ends of the tenons of the lower follower, O, are placed in keepers R, attached to the inner edges of the lower ends of the rack-bars S, and the ends of the tenons of the upper follower, P, are placed in keepers T, attached to the inner edges of the upper ends of the rack-bars U. The keepers T are made open upon their rear or outer sides, so that the tenons of the upper follower, P, can pass out of the said keepers laterally. The outer edges of the rack-bars S U are tongued, and rest against grooved shoulders V, formed upon the outer sides of the ends A, and the gear-teeth formed upon the inner edges of the said rack-bars mesh into the teeth of small gear-wheels W upon the opposite sides of the said wheels. The gear-wheels W are pivoted to the middle parts of the ends A of the press and to supports X, attached to the said ends.

With the small gear-wheels W are rigidly connected the large ratchet-wheels Y, so that the followers O P will be moved toward each other to compress the substance into a bale by operating the said ratchet-wheels Y.

To the forward ends of the top bars of the supports X, and to the ends A, are pivoted the ends of two levers, Z, the outer parts of which are connected by one or more cross-bars, a, so that the two levers Z will move together.

To the levers Z, at a little distance from their lower ends, are hinged the hook-pawls b, which are made long, and are curved downward, so as to pass over the upper parts of the ratchet-wheels Y, as shown in Fig. 1, so the said pawls will turn the ratchet-wheels Y through the space of four or five teeth at each stroke of the levers Z.

To the levers Z, near their lower ends, are pivoted short hook-pawls c, which engage with the teeth of the forward upper parts of the ratchet-wheels Y, and which will move the said ratchet-wheels Y through the space of one tooth at each stroke of the levers Z. With this construction the long pawls b are used at the beginning of the operation, when the substance is loose and more speed is desired. As the compression proceeds and the substance becomes more compact, the long pawls are thrown out of gear and secured by pins or other suitable means, and the work is continued with the short pawls c, which work with less speed but greater power.

To supports attached to the ends A are hinged hook-pawls d, which rest upon the teeth of the ratchet-wheels Y and hold the said ratchet-wheels against being turned back by the resistance of the substance being compressed, while the working-pawls are being moved forward for another stroke.

Upon the middle parts of the rear sides of the short hook-pawls c are formed short upwardly-projecting arms e, which, when the levers Z are raised, come in contact with pins f, attached to the ends A, and raise the forward ends of the pawls c against the lower sides of the holding-pawls d, raising the forward ends of the said pawls d, so as to leave the ratchet-wheels Y free. This sudden withdrawal of resistance allows the substance of the bale to suddenly expand and give an impulse to the followers O P, when the weight of the bale and lower follower causes them to descend to the bottom of the press and raises the upper follower to the upper part of the press, leaving the bale in position to be readily removed, and the followers in position to receive material for another bale.

To the upper part of the rear side of the press is hinged the edge of a frame, g, so that the said frame, when not in use, can be turned down against the said rear side of the press. The frame g is supported, when raised into a horizontal position, by detachable inclined braces h, the lower ends of which rest in mortises in the rear side of the press, and their upper ends enter mortises in the end bars of the said frame g. The inner sides of the bars of the frame g are rabbeted to receive the sliding frame i, the end bars of which have tongues j upon their outer sides to enter grooves k in the inner surfaces of the tops of the ends A and support the said frame i when pushed inward.

To a short stud, l, attached to the outer bar of the frame i, is pivoted a lever-hook, m, which, when the said frame i is pushed inward, engages automatically with a catch, n, attached to the upper side of the edge of the follower P, so that the said follower will be drawn outward by and with the said frame i.

To the outer end of the lever-hook m is attached a small hook, o, to receive a cord when it is desired to draw the frame i outward and leave the follower P in its place. The frame i is drawn inward by a cord, p, attached to the center of the outer bar of the said frame i, and which passes over a pulley, q, pivoted in a recess in the upper part of the rear side, B, of the press. The frame i is drawn outward by a cord, r, attached to the center of the outer bar of the said frame i, and which passes over a pulley, s, pivoted in a recess in the outer bar of the frame g. With this construction, when the parts of the press are in the positions shown in Figs. 1 and 3, and the follower P is to be removed to allow material for a bale to be inserted in the press, the cord p is drawn upon, which forces the frame i inward, and causes the lever-hook m to engage with the catch n. The cord r is then drawn upon, which draws the frame i and the follower P outward together.

When the press has been supplied with material for another bale, the cord $p$ is drawn upon, which forces the frame $i$ inward, carrying the follower P into place. The cord $r$ is then passed over the trip-hook $o$, and is drawn upon, which raises the lever-hook $m$ from the catch $n$, and then draws the frame $i$ outward, leaving the follower P in place, ready to be forced downward by operating the levers Z.

If desired, the tongues and grooves at the rear edges of the rack-bars S U can be omitted, and blocks or shoes attached to the said rear edges of the said rack-bars to rest against the shoulders of the posts to receive the friction as the said rack-bars move up and down, the said rack-bars being kept in place by flanges formed upon the outer ends of the gear-wheels W or by guide-cleats attached to the press-frame.

Having thus described my invention, I claim as new and desire to secure by Letters Patent—

1. In a baling-press, the combination, with the followers O P, rack-bars S U, gear-wheels W, ratchet-wheels Y, and levers Z, of the long pawls $b$, the short pawls $c$, and the holding-pawls $d$, substantially as herein shown and described, whereby the followers can be moved with greater speed and less power when the material is loose, and with less speed and greater power when the material becomes more compact, as set forth.

2. In a baling-press, the combination, with the short pawls $c$, having projecting arms $e$, of the pins $f$, substantially as herein shown and described, whereby the said short pawls will be raised from the ratchet-wheels by their own forward movement, and will also raise the holding-pawls, releasing the ratchet-wheels, as set forth.

3. In a baling-press, the combination, with the double-walled ends A of the press and the doors E, of the pins H, the right-angled bars I, having pins K and indexes L, and the springs J, substantially as herein shown and described, whereby the bale can be weighed as it comes from the press, as set forth.

4. In a baling-press, the combination, with the side B of the press and the follower P, having catch $n$, of the hinged frame $g$ and its detachable braces $h$, the sliding frame $i$, the lever-hook $m$, having trip-hook $o$, and the cords $p$ $r$, substantially as herein shown and described, whereby the said follower can be readily withdrawn and replaced, as set forth.

5. In a baling-press, the combination, with the rack-bars U and the follower P, of the keepers T, open upon one side, substantially as herein shown and described, whereby the said bars and follower can be disconnected and connected automatically, as set forth.

SIMON P. HARBAUGH.

Witnesses:
 HERVY LANEY,
 H. SCOTT.